US006704716B1

(12) United States Patent
Force (10) Patent No.: US 6,704,716 B1
(45) Date of Patent: Mar. 9, 2004

(54) METHOD AND SYSTEM FOR CONDUCTING AN ONLINE TRANSACTION THAT ALLOWS THE SELLER AND BIDDER TO NEGOTIATE

(75) Inventor: Joseph Force, Grand Rapids, MI (US)

(73) Assignee: Mindepper, LLC, Grand Rapids, MI (US)

( * ) Notice: Subject to any disclaimer, the term of this patent is extended or adjusted under 35 U.S.C. 154(b) by 200 days.

(21) Appl. No.: 09/657,814

(22) Filed: Sep. 8, 2000

(51) Int. Cl.[7] .............................................. G06F 17/16
(52) U.S. Cl. ........................... 705/80; 705/26; 705/27; 705/37
(58) Field of Search ................. 705/1, 26, 27, 705/37, 80

(56) References Cited

U.S. PATENT DOCUMENTS

| 4,799,156 | A | 1/1989 | Shavit et al. | 364/401 |
|---|---|---|---|---|
| 5,629,982 | A | 5/1997 | Micali | 380/30 |
| 5,715,402 | A | 2/1998 | Popolo | 395/237 |
| 5,809,144 | A | 9/1998 | Sirbu et al. | 380/25 |
| 5,812,670 | A | 9/1998 | Micali | 380/25 |
| 5,835,896 | A | 11/1998 | Fisher et al. | 705/37 |
| 5,850,442 | A | 12/1998 | Muftic | 380/21 |
| 5,855,008 | A | 12/1998 | Goldhaber et al. | 705/14 |
| 5,862,223 | A | 1/1999 | Walker et al. | 380/25 |
| 5,924,082 | A | 7/1999 | Silverman et al. | 705/37 |
| 5,987,440 | A | 11/1999 | O'Neil et al. | 705/37 |
| 6,023,685 | A | 2/2000 | Brett et al. | 705/37 |
| 6,035,288 | A | 3/2000 | Solomon | 705/37 |
| 6,035,289 | A | 3/2000 | Chou et al. | 705/37 |
| 6,038,554 | A | 3/2000 | Vig | 705/400 |
| 6,041,308 | A | 3/2000 | Walker et al. | 705/14 |
| 6,047,274 | A | 4/2000 | Johnson et al. | 705/412 |
| 6,055,504 | A | 4/2000 | Chou et al. | 705/1 |
| 6,055,519 | A | 4/2000 | Kennedy et al. | 705/80 |
| 6,058,379 | A | 5/2000 | Odom et al. | 705/37 |
| 6,058,417 | A | 5/2000 | Hess et al. | 709/219 |
| 6,064,981 | A | 5/2000 | Barni et al. | 705/26 |
| 6,078,906 | A | 6/2000 | Huberman | 705/37 |
| 6,108,639 | A | 8/2000 | Walker et al. | 705/26 |
| 6,408,282 | B1 | * 6/2002 | Buist | 705/37 |
| 2002/0103740 | A1 | * 8/2002 | Maroney | 705/37 |

FOREIGN PATENT DOCUMENTS

| JP | 2001-202461 | * 7/2001 |
|---|---|---|
| WO | WO 97/22074 | 6/1997 |
| WO | WO 00/21013 | 4/2000 |
| WO | WO 00/39732 | 7/2000 |

OTHER PUBLICATIONS

Razzi: "Keep the offer in play. (price bargaining in home buying and selling)(includes a related article on tax information for buyers and sellers)(Cover Story)"; Kiplinger's Personal Finance Magazine; Apr. 1998, vol. 52, No. 4, p. 92.*

AFX ASIA (Focus): "China Huarong AMC's NPL auction date moved to Nov. 19"; Nov. 5, 2001.*

H. Cardoso et al., "A Multi–Agent System for Electronic Commerce including Adaptive Strategic Behaviours," Faculdade di Engenharia, Universidade do Porto.

(List continued on next page.)

Primary Examiner—Edward R. Cosimano
(74) Attorney, Agent, or Firm—Morgan, Lewis & Bockius LLP (57) ABSTRACT

A method and system for conducting an online transaction that allows a seller and a bidder to negotiate a final sale price. The system displays information about the item. An offer is received from at least one bidder. The system enables the seller and bidder to negotiate by allowing each party a predetermined number of responses. After the predetermined number of responses is met without a sale, the system enables the seller and a subsequent bidder to negotiate.

45 Claims, 10 Drawing Sheets

OTHER PUBLICATIONS

C. Dembeck, "Online Sellers Compete for Buyers at NexTag.com," E–Commerce Times, .EcommerceTimes.com, Aug. 9, 1999.

T. Sandholm et al., "Bargaining with Deadlines," WUCS–99–06, Feb. 1, 1999.

S. Su et al., "A Replicable Web–Based Negotiation Server for E–Commerce," University of Florida, Jan. 2000.

A. Wang, "Xoom.com Lauches Person–To–Person Auctions," E–Commerce Times, .EcommerceTimes.com, Jul. 23, 1999.

P. Wurman et al., "The Michigan Internet AuctionBot: A Configurable Auction Server for Human and Software Agents," Univ. of Michigan.

"GolfWeb Auction," .auction.golfweb.com.

"Negotiate Your Price," .NexTag.com.

"Neuco Auctions," .neuco.com.

"The Seller Connection," .metalsite.net.

* cited by examiner

| ITEM # | ITEM TITLE | ASKING PRICE | AVAILABILITY | QUEUE | END DATE |
|---|---|---|---|---|---|
| 395509967 | 1962 ELVIS GIRLS GIRLS GIRLS POSTER $$$$$$ | $49.99 | NEGOTIATIONS | 2 | AUG-8 07:56 |
| 395546573 | LARGE ELVIS WITH COKE IN SODA SHOPPE POSTER | $7.99 | NEGOTIATIONS | 1 | AUG-08 09:35 |
| 398336213 | ELVIS SENSUAL KISS 56 WERTHEIMER PHOTO POSTER | $14.50 | BUY NOW! | 0 | AUG-08 12:15 |
| 385204982 | MINT CONDITION ELVIS PRESLEY POSTER ◀CLICK $$$$$$ | $47.50 | BUY NOW! | 0 | AUG-08 12:18 |
| 395661633 | ELVIS 1965 TICKLE ME ORIG. MINT 1SH POSTER | $104.49 | BUY NOW! | 0 | AUG-08 12:21 |
| 395662896 | ELVIS WITH COKE IN SODA SHOPPE POSTER XLARGE | $7.99 | NEGOTIATIONS | 1 | AUG-08 12:23 |
| 398365905 | BRIAN WILSON/SETZER/ELVIS COSTELLO POSTER!! | $19.95 | NEGOTIATIONS | 4 | AUG-08 12:54 |
| 400303126 | "ELVIS PRESLEY ON STAGE" POSTER | $7.95 | BUY NOW! | 0 | AUG-08 16:11 |
| 398527346 | ELVIS PRESLEY POSTER! | $6.95 | NEGOTIATIONS | 1 | AUG-08 16:15 |
| 398537582 | VINTAGE ELVIS COSTELLO PROMO POSTER NR!! | $10.50 | NEGOTIATIONS | 1 | AUG-08 16:27 |
| 400337667 | ELVIS COSTELLO ANNIE LEIBOVITZ 1982 POSTER! | $9.99 | BUY NOW! | 0 | AUG-08 16:45 |
| 401950615 | ELVIS PRESLEY CLASSIC CONCERT POSTER | $9.00 | BUY NOW! | 0 | AUG-08 17:06 |
| 398596081 | ELVIS PRESLEY MOVIE POSTER PAYPAL $$$$$$ | $9.99 | BUY NOW! | 0 | AUG-08 17:23 |
| 398601932 | ELVIS ORIGINAL ALBUM PROMO POSTER | $5.99 | NEGOTIATIONS | 1 | AUG-08 17:27 |
| 395938271 | ELVIS PRESLEY - COLLAGE: 16x20 POSTER/ PRINT | $9.99 | NEGOTIATIONS | 2 | AUG-08 18:11 |
| 398693018 | 1969 ELVIS CONCERT POSTER LAS VEGAS PAYPAL $$$$$$ | $6.99 | BUY NOW! | 0 | AUG-08 18:41 |

*FIG. 5*

385204982 - MINT CONDITION ELVIS PRESLEY POSTER

ASKING PRICE: $47.50
SELLER: ARGO4932 [287]
NUMBER IN SALES QUEUE: 0

ITEM DESCRIPTION:
THIS POSTER IS FROM THE ORIGINAL SHOWING OF THE 1962 ELVIS PRESLEY PARAMOUNT FILM GIRLS! GIRLS! GIRLS! IT
HEAVY PRESSED PAPER. THE CONDITION IS GENERALLY VERY GOOD TO NEAR-EXCELLENT, HOWEVER THE RIGHT EDGE OF T
CUT WITH SCISSORS ALONG THE EDGE, APPARENTLY FROM WHEN IT WAS TRIMMED TO FIT THE DISPLAY FRAME IN THE ORI
HOUSE. THE NARROWEST WIDTH IS AT THE TOP, MEASURING 26-3/8 INCHS AND THE WIDEST IS AT THE MIDDLE, MEAS
INCHES, AND THE BOTTOM MEASURES 26-1/2 INCHES. IT SHOULD RESTORE NICELY WITH A UNIFORM EDGE OF NO LESS T
INCHES.

IMAGE(S) OF ITEM:

PURCHASE INFORMATION:
ACCEPTED PAYMENT METHODS: PERSONAL CHECK. CASHIER'S CHECK / MONEY ORDER.
LOCATION: KISSIMMEE, FL, UNITED STATES
SHIPPING TERMS: BUYER PAYS. WILL SHIP INTERNATIONALLY.

VIEW OTHER ITEMS LISTED BY ARGO4932

STARTING TIME: 07/29/2000 18:35:52 PDT
CLOSING TIME: 08/08/2000 06:55 PDT

*FIG. 6*

*BUYER*

METHOD AND SYSTEM FOR CONDUCTING AN ONLINE TRANSACTION THAT ALLOWS THE SELLER AND BIDDER TO NEGOTIATE

BACKGROUND OF THE INVENTION

1. Field of the Invention

The present invention relates to a method and system for conducting an online transaction, and more particularly, to a method and system for conducting an online transaction that allows the seller and bidder to negotiate the final sale price.

2. Background of the Invention

Advances in computer processing power and network communications have made information from a wide variety of sources available to users on computer networks. Computer networking allows network computer users to share information, software applications and hardware devices, and internetworking enables a set of physical networks to be connected into a single network such as the Internet. Computers connected to the Internet or connected to networks other than the Internet also have access to information stored on those networks. The World Wide Web (Web), a hypermedia system used on the Internet, enables hypertext linking, whereby documents automatically reference or link other documents located on connected computer networks around the world. Thus, users connected to the Internet have almost instant access to information stored in relatively distant regions.

A page of information on the Web may include references to other Web pages and may include a broad range of multimedia data including textual, graphical, audio, and animation information. Currently, Internet users retrieve information from the Internet, through the Web, by 'visiting' a web site on a computer that is connected to the Internet.

The web site is, in general terms, a server application that displays information stored on a network server computer. The web site accepts connections from client programs, such as Internet browser applications. Browser applications, such as Microsoft Explorer™ or Netscape Internet Browser™, allow Internet users to access information displayed on the web site. Most browser applications display information on computer screens and permit a user to navigate through the Web using a mouse. Like other network applications, Web browsing uses a client-server paradigm. When given a Uniform Resource Locator (URL) of a document, the browser application becomes a client and it contacts a server application specified in the URL to request the document. After receiving the document from the server application, the browser application displays the document to the user. When the browser application interacts with the server application, the two applications follow the Hyper-Text Transport Protocol (HTTP). HTTP allows the browser application to request a specific article, which the server application then returns. To ensure that browser applications and server applications inter-operate unambiguously, HTTP defines the exact format for requests sent from the browser application to the server application as well as the format of replies that the server application returns. As the number of physical networks connected to the Internet continues to grow, so too will the number of web sites that are accessible to Internet users and so too will commercial activity on the Internet. Providers of a wide range of products and/or services are continuously exploring new methods for promoting and selling them. For example, many seller's offer products and services that are sold using an auction-type process.

As the Internet continues to evolve into an effective medium for conducting transactions between parties, various Web-based sites currently offer online auctions or facilitate online transactions. The Internet, which constitutes a network of networks, provides an easily accessible and user-friendly base from which to conduct auctions and online transactions.

The seller usually provides information about a sale item, a minimum acceptable sale price, and the number of days the auction will run. The item information and the opening and closing time of the auction are then displayed to a community of bidders. Once the bidding window of the auction opens, the bidders submit bids that are continually processed in order to determine the highest bid. During the auction, the highest bid is continually updated and displayed to the bidders.

Outside of the initial information about the sale item provided by the seller and the bid from the bidder, there is no further interaction between the parties. The seller cannot respond to a bidder's offer with a counter-offer, thereby transforming the traditional auction into a one-on-one negotiation. This lack of interaction prevents the parties from possibly negotiating a mutually agreeable price and prevents the parties from utilizing their respective negotiating skills.

Current online auctions operate an open-bidding format, whereby the highest bid or even the bidding history is displayed to all bidders. This feature has three distinct effects on the progress and outcome of the auction. First, the order in which the bids are received is not particularly important to the outcome of the auction, because the highest bid at the end of the auction prevails. Therefore, this format favors the last in line and precludes earlier submitted bids from being considered by the seller. Second, open-bidding prevents any exclusive interaction between the seller and bidder from taking place. Third, since the highest bid is continually disclosed to all bidders, subsequent bidders can use this information to narrowly out bid the current highest bid.

Another feature of current online auctions is the time-limited bidding window. The seller solicits the highest bid from a community of bidders within a predetermined time frame. This feature has three limitations. First, a simulated real-time auction forces a bidder to continually monitor the progress of the auction. If an auction is based on the format in which the highest bidder within a certain time frame prevails, then all participating bidders are forced to monitor the auction. Since the highest bid is tracked and displayed to all bidders, a subsequent bidder can easily out-bid a previous bidder, who may have in the meantime logged off the auction site. Therefore, in order to insure a successful bid, the bidder must diligently monitor the auction, particularly the closing minutes.

Second, a bidding window limits the seller's control over the final price. The seller sets an acceptable minimum price, but the seller does not decide which particular bid to accept. Simply, the highest bid above the minimum acceptable bid at the end of the auction is the winning bid. The seller is not given the opportunity to accept an earlier bid or stall and accept a bid which might have otherwise been submitted after the closing of the artificial bidding window.

Third, a competitive bidding process at the close of a bidding window may entice some bidders to irrationally and without reflection submit higher bids than they would have normally submitted. The exciting and frantic ending of an auction may cause some bidders to bid higher for an item, even though under calmer circumstances they would not have made the same bid.

In light of the foregoing, it is desirable to provide an integrated online transaction system that permits the seller to negotiate with potential bidders, who have submitted undisclosed bids. In particular, it would be advantageous to enhance the auction experience with one-on-one interaction between the seller and bidder.

SUMMARY OF THE INVENTION

Accordingly, the present invention is directed to method and system for conducting an online transaction that substantially obviates one or more of the problems due to limitations and disadvantages of the related art.

One object of the present invention is to provide to both the sellers and bidders more flexibility and control during an online transaction.

Another object of the present invention is to provide the seller the ability to consider each bid submitted and to negotiate with a bidder.

Another object of the present invention is to provide the bidder the ability to participate in an online transaction without having to monitor the progress and closing of the transaction window.

A further object of the present invention is to provide the seller and bidder the opportunity to utilize their respective negotiating skills.

Another object of the present invention is to provide a bidding environment not restricted by time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a method for conducting an online transaction that allows a seller and a bidder to negotiate, including the steps of displaying information about an item; receiving an offer from at least one bidder; enabling the seller and only one bidder to negotiate by allowing the seller and the bidder each a predetermined number of responses; and enabling the seller and a subsequent bidder to negotiate, after the predetermined number of responses is met without a sale.

In another aspect, the present invention provides a system for conducting an online transaction that enables a seller and a bidder to negotiate a sale price of an item that includes means for receiving information regarding an item from the seller; means for storing the information; means for displaying information regarding the item and the transaction; means for receiving and storing offers from the bidder; means for enabling the seller or bidder to terminate a negotiation; and means for enabling the seller to negotiate with a subsequent bidder.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like elements.

Figure 1:
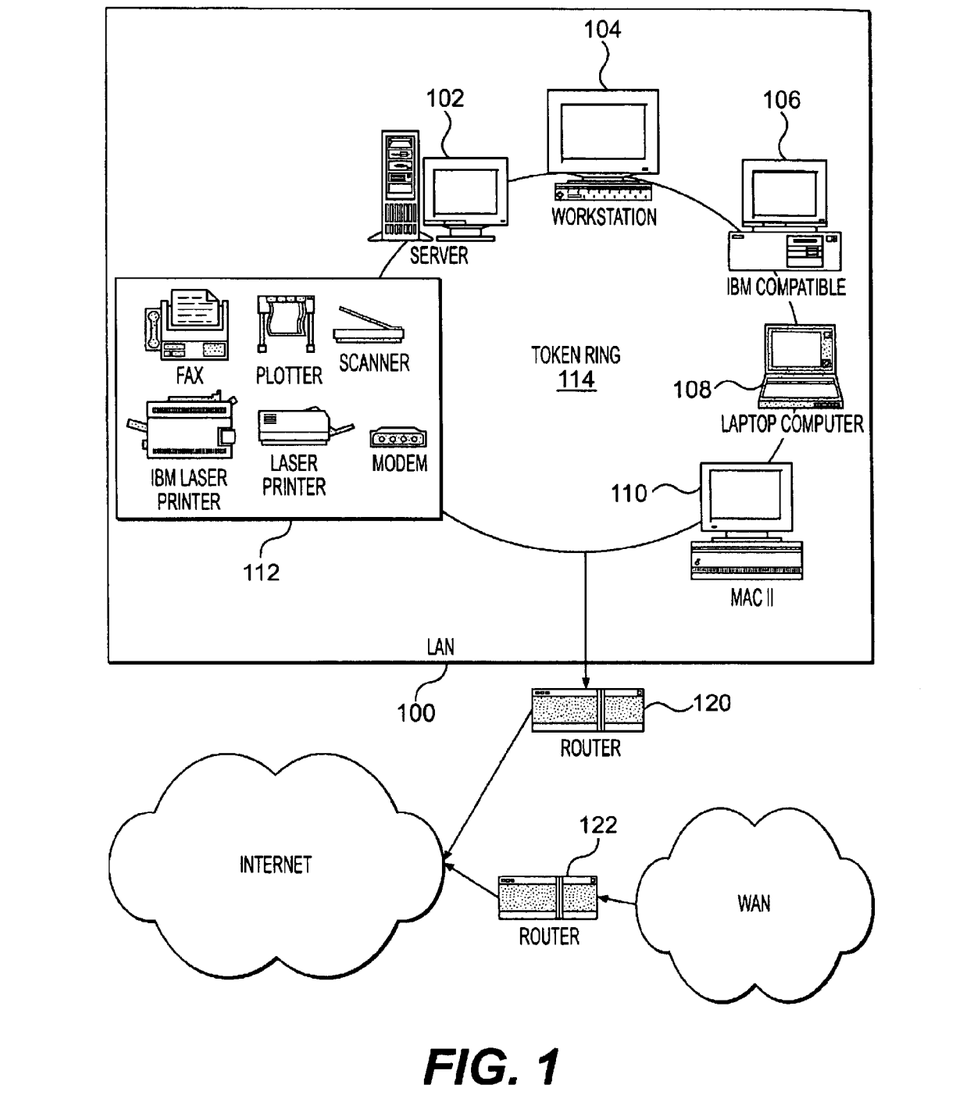
FIG. 1 is an example of a local area network connected to other computer networks.

FIG. 1 is an example of a local area network (LAN) 100 that is configured to utilize a non-repudiation protocol. LAN 100 comprises a server 102, four computer systems 104, 106, 108, and 110, and peripherals 112, such as printers and other devices that may be shared by components on LAN 100. Computer systems 104, 106, 108 and 110 may serve as clients for server 102 and/or as clients and/or servers for each other and/or for other components connected to LAN 100. Components on LAN 100 are preferably connected together by cable media, for example copper or fiber-optic cable and the network topology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used. Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and the routers that connect them must adhere to a standard protocol. Computer networks connected to the Internet and to other networks typically use TCP/IP Layering Model Protocol. It should be noted that other internetworking protocols may be used.

Figure 2:
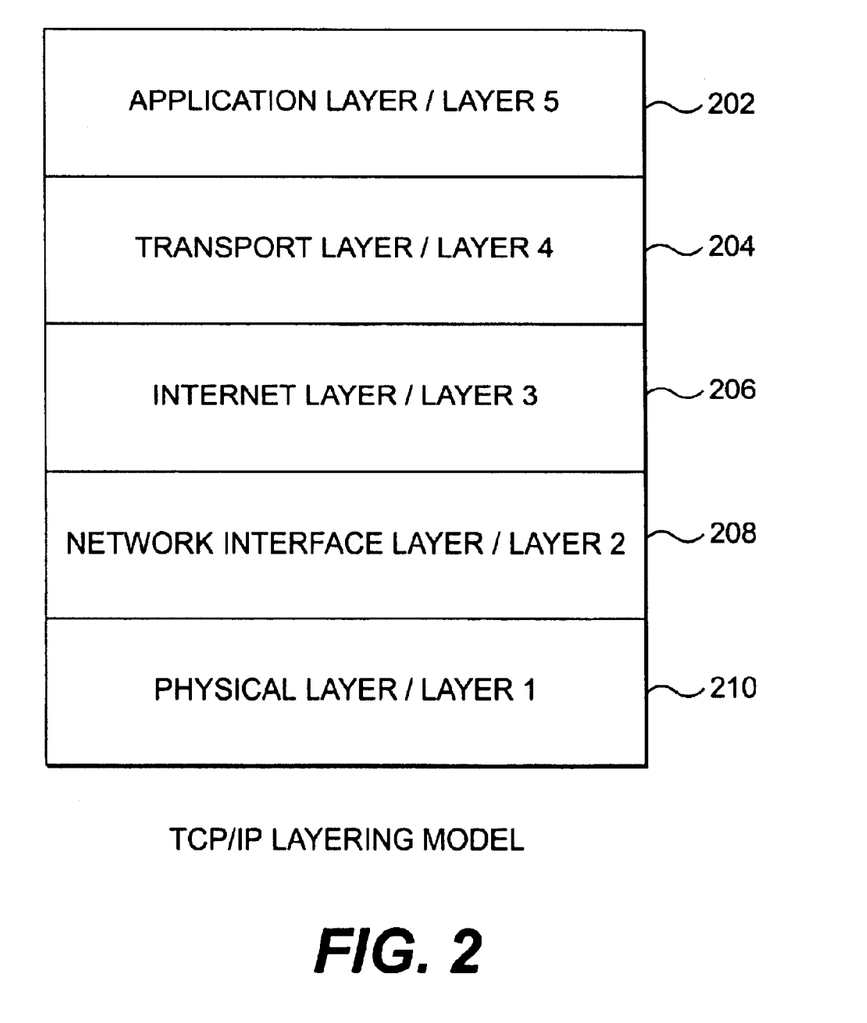
FIG. 2 shows a schematic of the TCP/IP Layering Model.

As illustrated in FIG. 2, the TCP/IP Layering Model comprises an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

The present invention provides an Internet-based system for selling items that enables a seller to solicit bids from online bidders and to negotiate a final sale price with a particular bidder. A preferred embodiment of the present invention will be described in greater detail below.

System Overview

Figure 3:
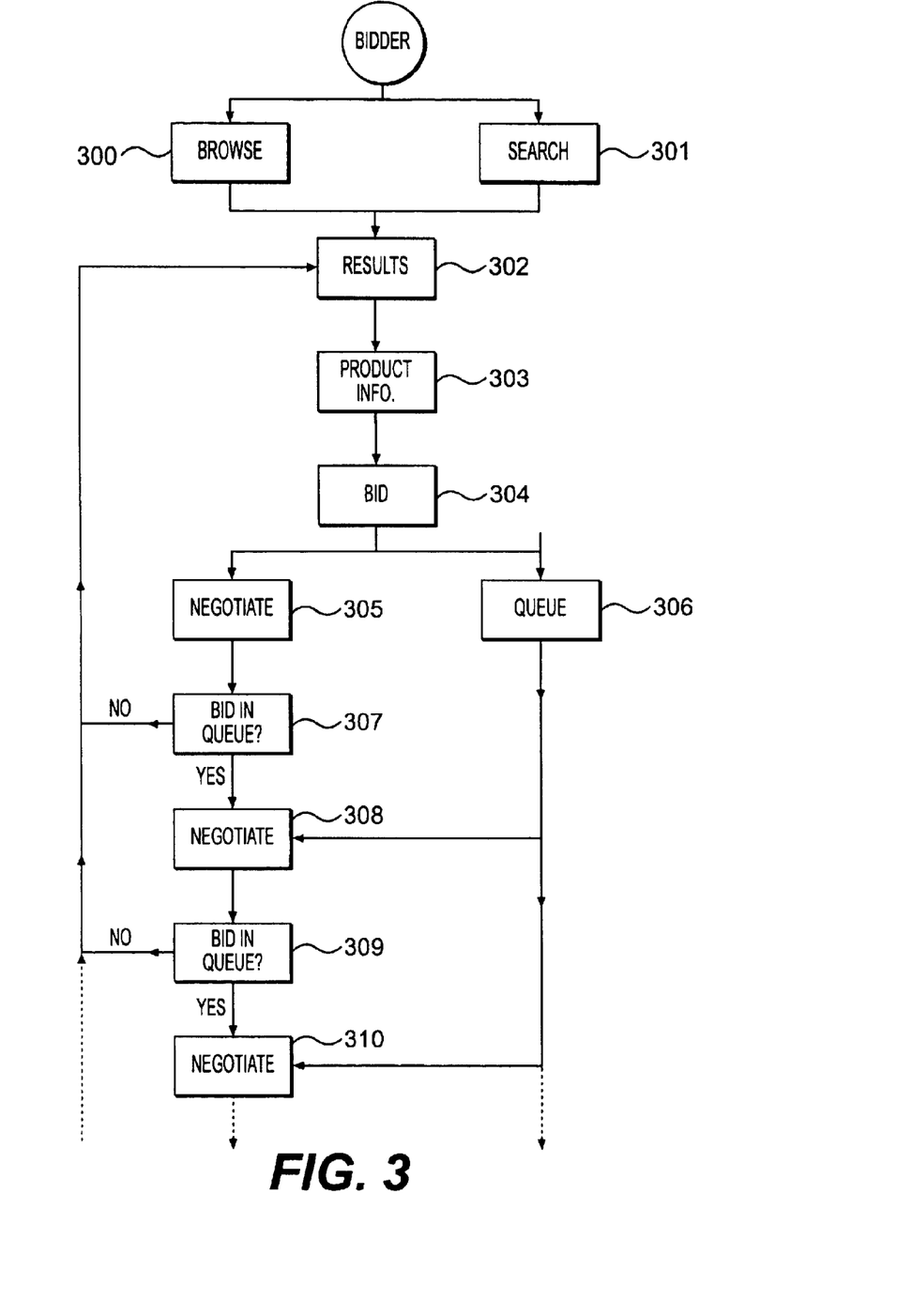
FIG. 3 shows a block diagram of one preferred embodiment of an overview of the inventive online transaction system.
Figure 4:
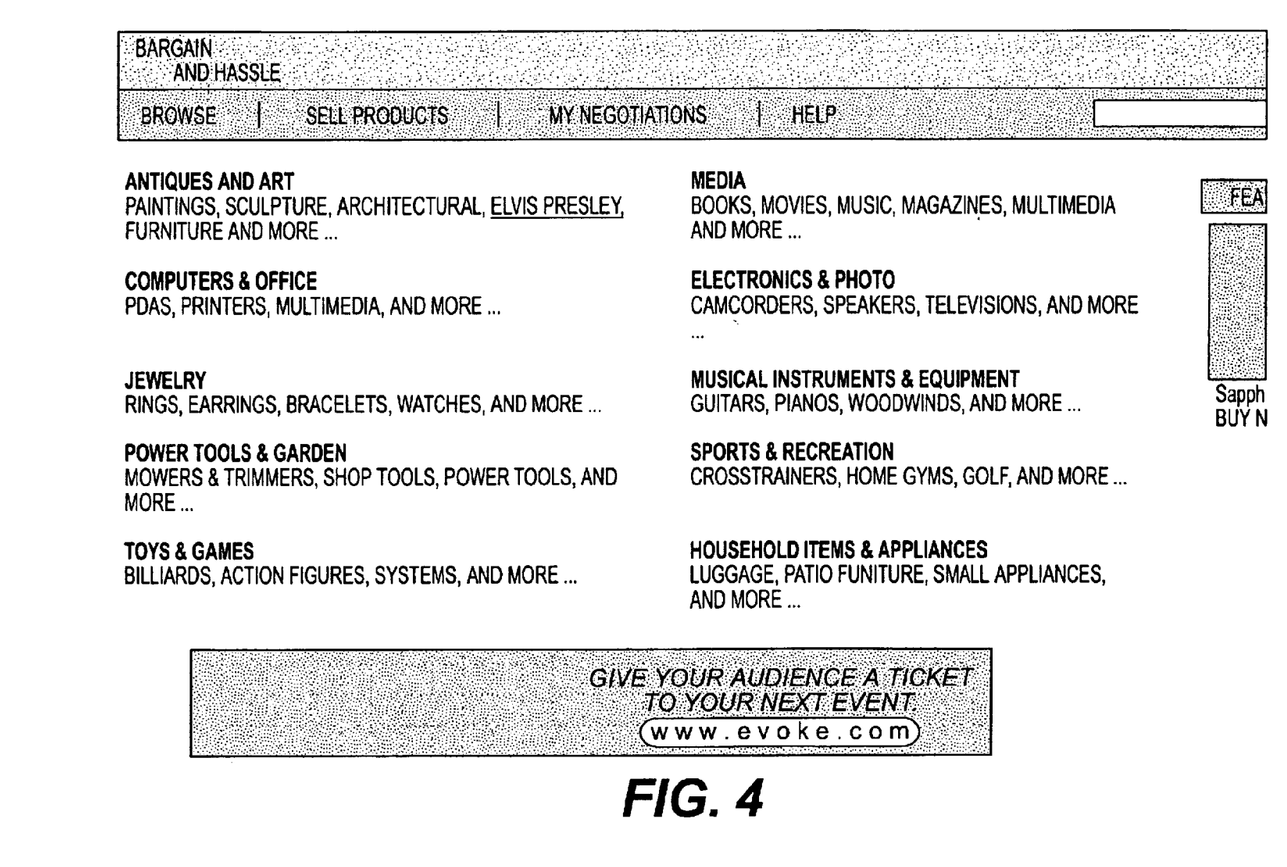
FIG. 4 shows a sample screen shot from a bidder browsing categories of items.

FIG. 3 depicts the general sequence of an online transaction that operates in accordance with the present invention. The system provides the bidder the ability to either browse 300 or search 301 for items currently being sold. An example of a Web page for browsing the categorized items for sale is shown in FIG. 4. It should be apparent to those of ordinary skill in the art that an online transaction may also be used, for example, to lease or exchange items. By either browsing the categorized items or by searching for a particular item, a results page 302 with a list of available items is displayed to the bidder.

Figure 5:
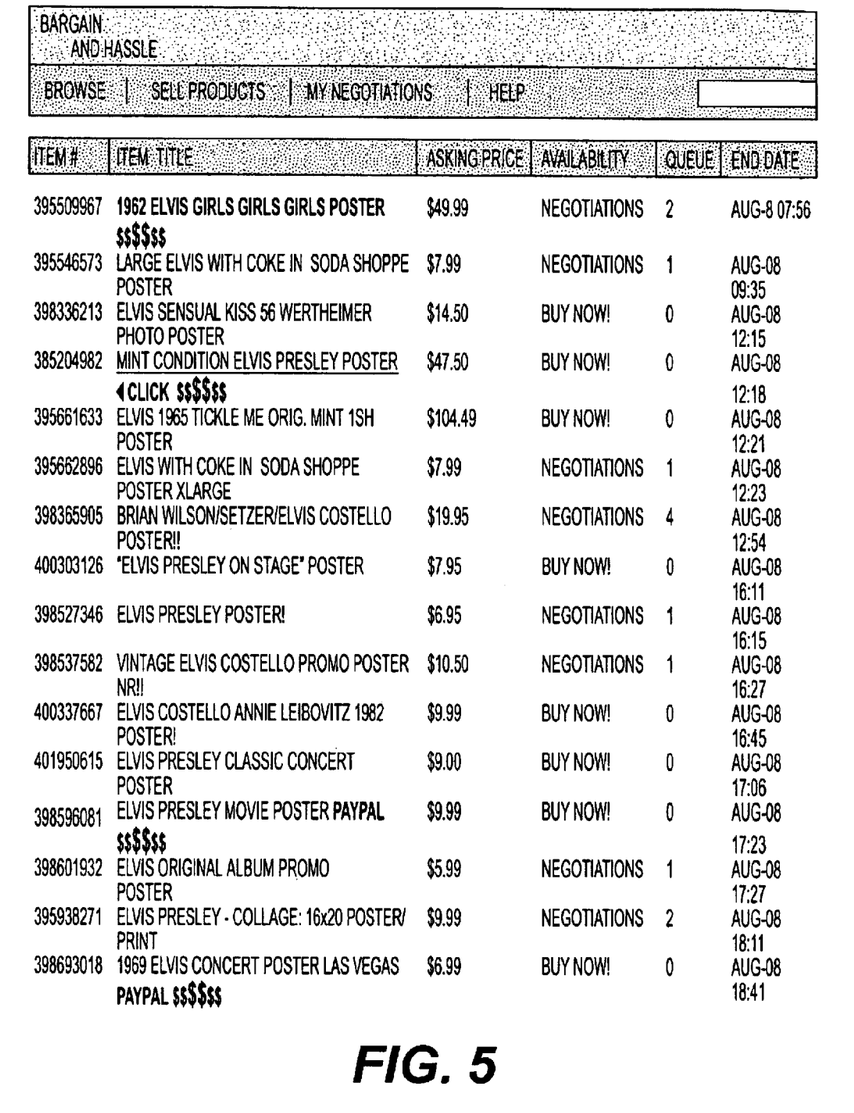
FIG. 5 shows a sample listing of items.

FIG. 5 shows a sample results page. Preferably, the system of the present invention displays the name of the item, the seller's asking price, the status of the transaction, and the number of bids currently awaiting consideration. This information provides the bidder relevant information for bidding on an item and for negotiating a price with the seller. The asking price informs the bidder of the seller's initial price expectation. Unlike other transaction formats, this price does not necessarily represent the seller's minimum price. The current status of the transaction is indicated as either in "negotiations" (i.e. an offer is being considered by the seller) or "buy now!" (i.e. no offers are pending). If an item is currently being negotiated, the number of bids pending or awaiting consideration is also displayed to the bidder.

Figure 6:
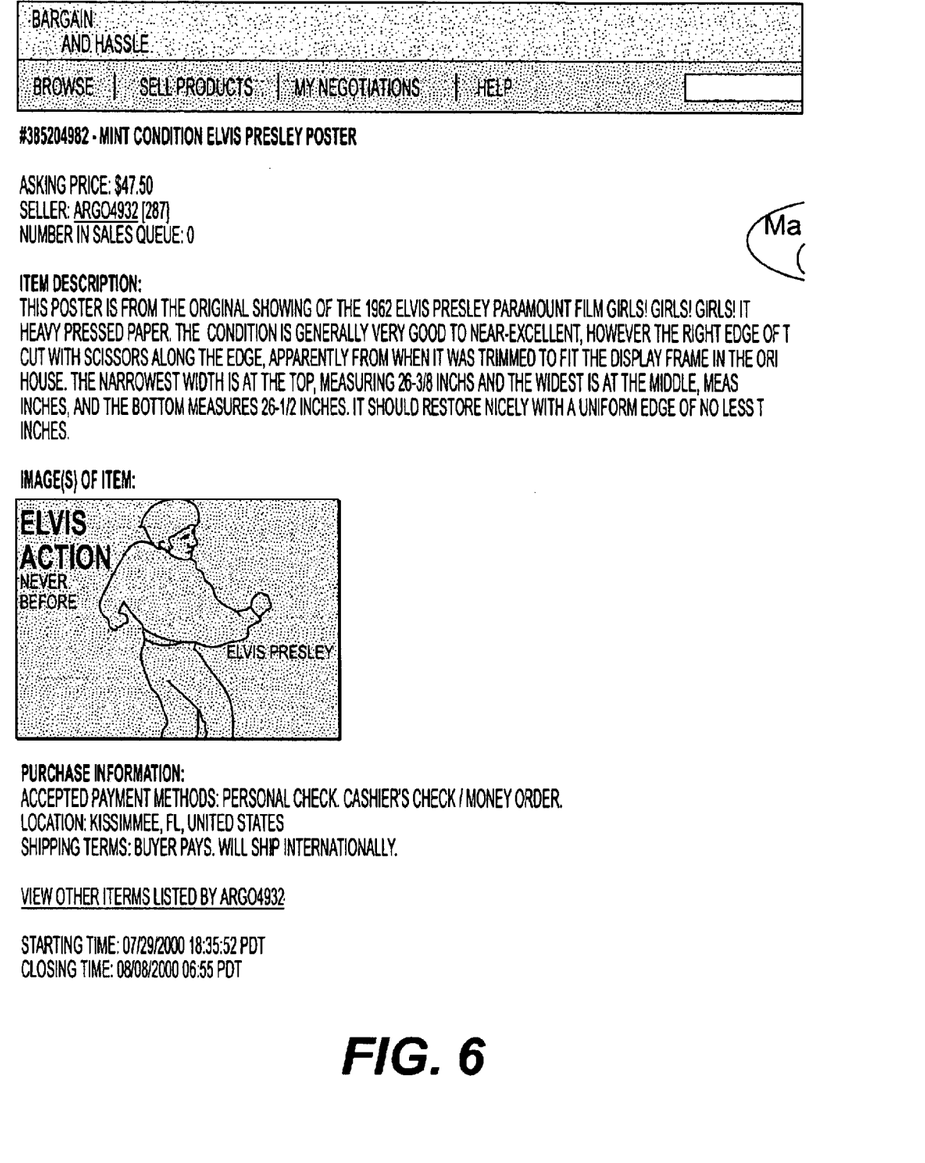
FIG. 6 shows a sample product information page.

From the results page 302 of FIG. 3, the bidder may obtain more detailed information about an item and about the seller. According to the system of the present invention, the title of the item on the results page 302 is hyper-linked to a products information page 303, a sample of which is shown in FIG. 6. Preferably, the product information page 303 of FIG. 3 displays a description and image of the item, purchase information, and the seller's transaction identity. As will be obvious to one skilled in the art, other means for describing the item, for example, a video or sound file, may be included on the product information page 303. The purchase information includes payment methods, the geographic location of the seller, and the terms under which the seller is willing to ship the item to the bidder. Further information about the seller that is available to the bidder includes the seller's rating as determined by the present system, the seller's past transaction history, and comments about the seller from previous bidders.

Figure 7:
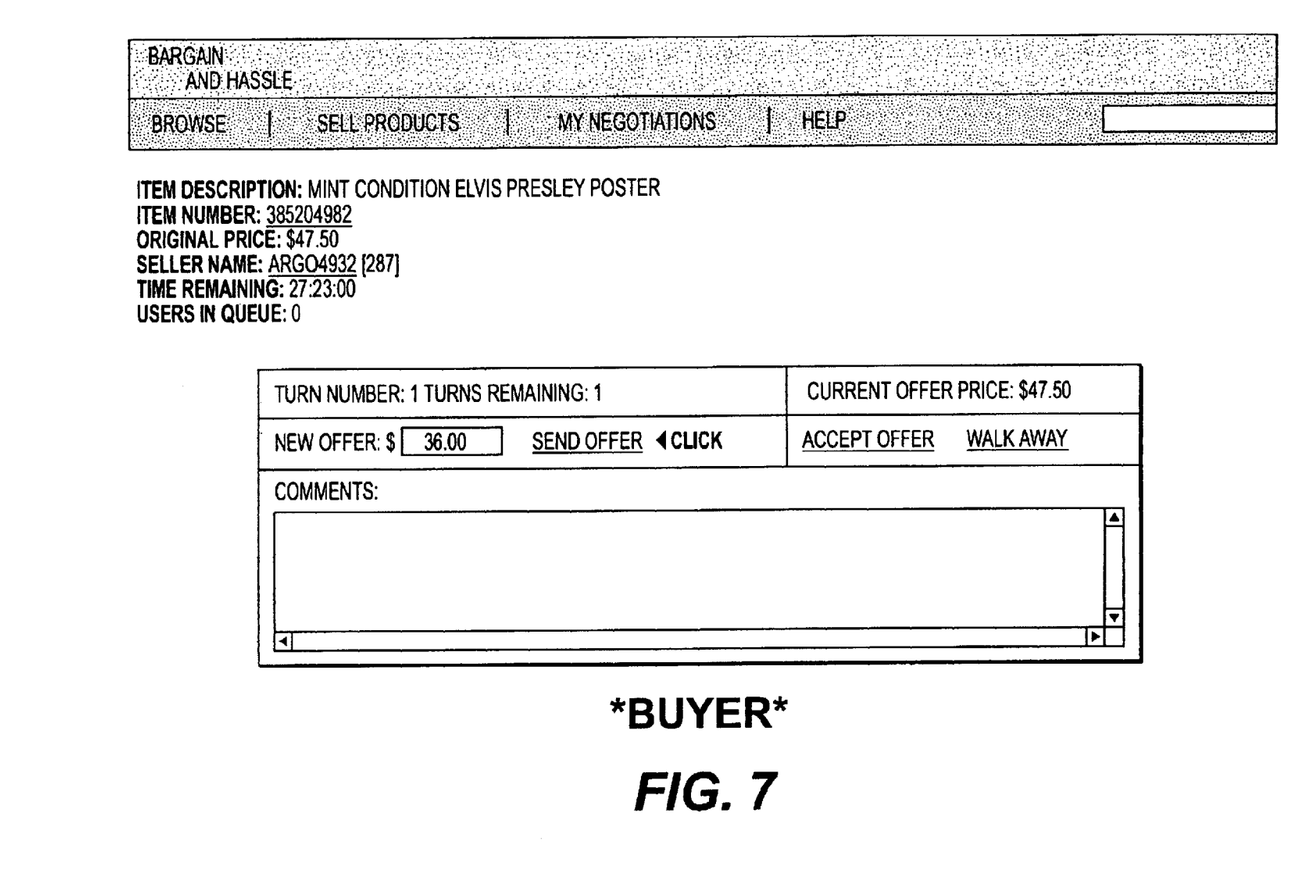
FIG. 7 shows a sample bidder's page for making an offer.

If, after reviewing the product information page 303, the bidder decides to submit a bid, the bidder is directed to a bidder's offer page 304. FIG. 7 shows an example of a sample bidder's 5 offer page. The system of the present invention enables the seller and bidder to interact one-on-one. The bidder may submit an offer and a comment that will be presented to the seller, unless the seller accepts an earlier bid. The offer price is not disclosed to other bidders or potential bidders. Maintaining a closed bidding process has advantages for both parties to the transaction. The seller avoids having multiple bidders submit bids that narrowly exceed the previously highest bid, while the multiple bidders avoid the competitive bidding environment of an open-bidding system.

The system of the present invention also insures that the bids are considered by the seller in the order in which they are received. If the seller is not already locked into a negotiation, the seller and bidder enter into a negotiation 305. On the other hand, if the seller is currently in negotiations with another bidder, then the bidder's offer is stored in a queue at 306. When negotiating, the seller is prevented from seeing subsequent bids and from negotiating with other bidders. Therefore, an offer under consideration locks the seller and bidder into a one-on-one negotiating environment, thereby blocking other offers from temporarily being considered by the seller. The one-one-one interaction between the seller and bidder injects each party's respective negotiating skills into the online transaction system.

Assuming that no negotiations are underway, a bidder's bid at 304 would be presented to the seller and negotiations 305 with that bidder would commence. Preferably, the system of the present invention provides an online transaction window that runs for two weeks, but may conclude earlier by the seller's decision to sell. Therefore, a seller may accept the first offer submitted, consequently ending the transaction within minutes. On the other hand, the seller may refuse to accept any offers and continue to have an item open for bidding. If the parties fail to reach an agreement, the negotiation 305 is terminated and the system queries at 307 whether there is a pending offer in the queue. If there is no offer pending, the item is listed as open for bidding on the results page 302. However, if there is a bid in the queue 306, then the seller enters into a second negotiation 308 with the next bidder submitting a bid.

According to the system of the present invention, a first bidder must not remain online to monitor and participate in subsequent bids, which may be lower or higher in price. The queued bids 306 are presented to the seller in the order in which they are received. Since the bids are confidential and only disclosed to the seller one at a time, each bidder has the opportunity to have their bid considered by the seller until a negotiation results in a sale. Thus, an earlier low bid is still presented to the seller, even though a later bid may be higher in price.

If the parties to a second negotiation 308 fail to agree on a price, the system again checks at 308 whether any bids are pending. The steps of checking for pending bids 309 and entering subsequent negotiations 310 is continued until a negotiation concludes successfully or the online transaction window closes.

The Negotiation

Figure 8:
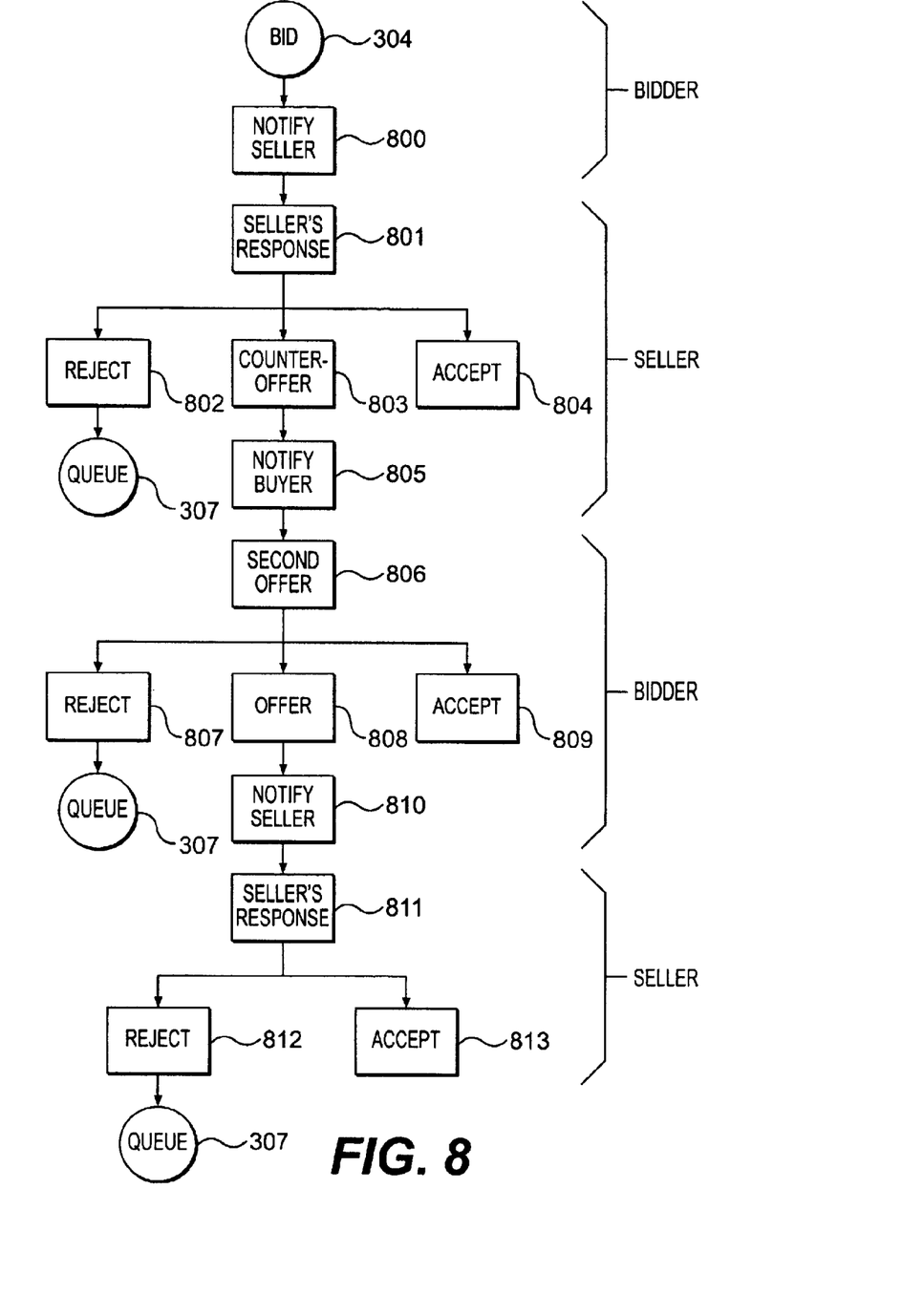
FIG. 8 shows a block diagram of one preferred embodiment of the present invention directed to a negotiation between a seller and bidder.

According to a preferred embodiment of the present invention, the seller's and bidder's ability to negotiate 305 consists of four stages. A block diagram of the preferred negotiation stages is shown in FIG. 8. The one-on-one negotiation consists of the following stages: (1) a first offer by the bidder; (2) a response by the seller, (3) a second offer by the bidder, and (4) a second response by the seller. Depending on the seller's response at stage 2, the negotiation may either terminate or continue to stages three and four. The seller has a maximum of two responses, while the bidder has a maximum of two offers. Of course any number of responses can be chosen, and are within the scope of the present invention.

Figure 9:
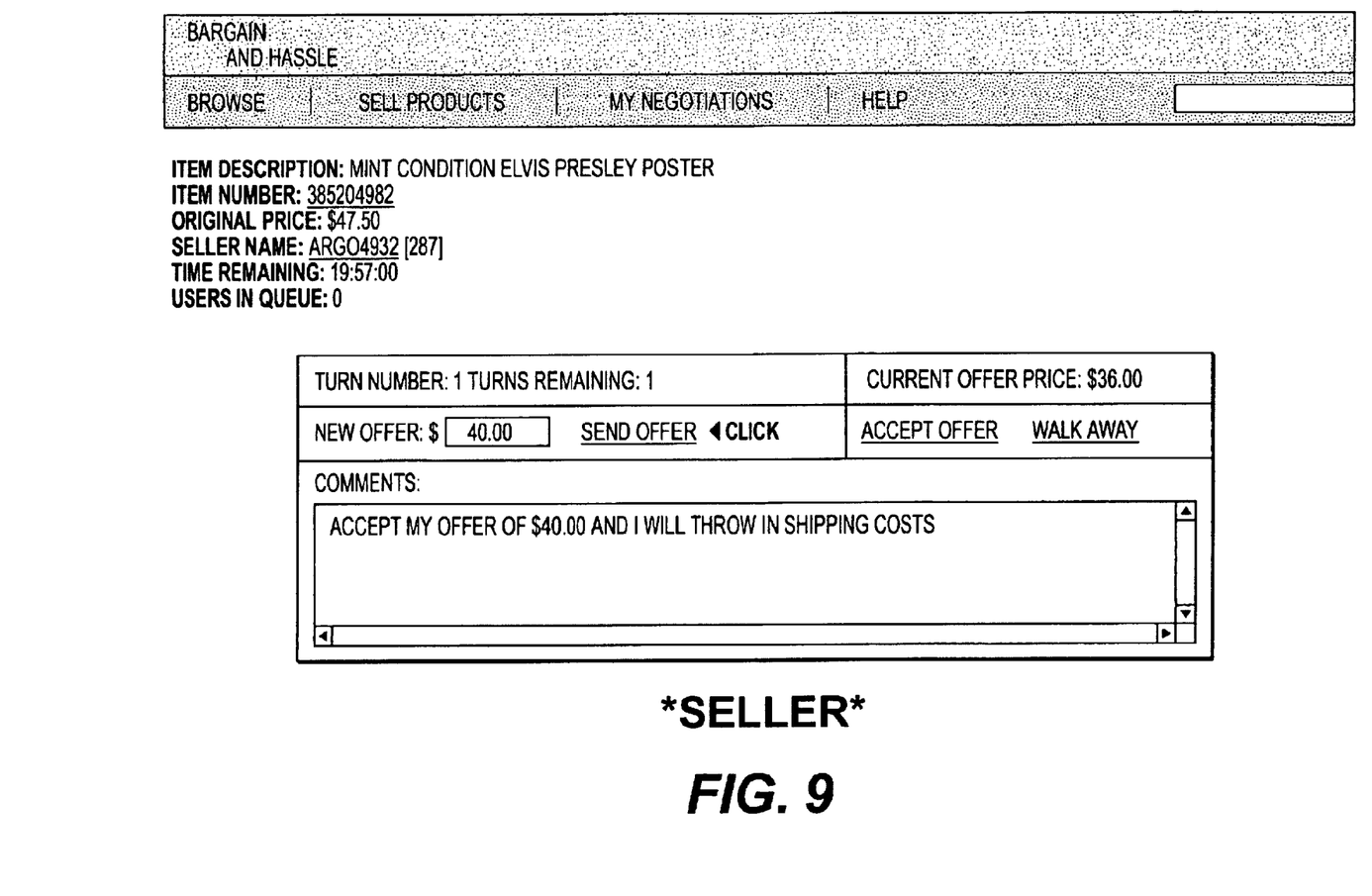
FIG. 9 shows a sample seller's page for responding to an offer.

The negotiation at 305 is initiated by the bidder submitting a bid at 304. The system then notifies the seller 800 of FIG. 8 of a pending bid. Preferably, an e-mail containing a hyper-link to a seller's response page at 801 is sent to the seller. Other methods of notifying a seller of a bid is known to those skilled in the art and are within the scope of the present invention. A sample seller's response page 801 is shown in FIG. 9. The preferred embodiment of the present invention displays at 801 the bidder's offer and comment, and the number of responses the seller has remaining.

In stage two of the negotiation, the seller may reject 802 (i.e. walk away from the negotiation), counter-offer 803, or accept 804 the bidder's offer. A rejection 802 of the offer ends the negotiation 305 with that particular bidder. The system then queries whether there is another bid at 307, as explained above. If the seller accepts 804 the bidder's first offer, then the negotiation 305 and transaction are terminated. The bidder would then be notified of the acceptance and would receive the seller's contact information. The seller would be informed of the bidder's contact information. Furthermore, the seller would be presented with an integrated shipping interface in order to facilitate the transaction. However, if the seller neither rejects 802 nor accepts 804 the bidder's offer, the seller may respond with a counter-offer 803. Preferably, the seller enters the counter-offer into the response interface and may also enter a comment to be read by the bidder. The ability of the seller to respond to the bidder's offer introduces a negotiating element into the traditional auction format.

Figure 10:
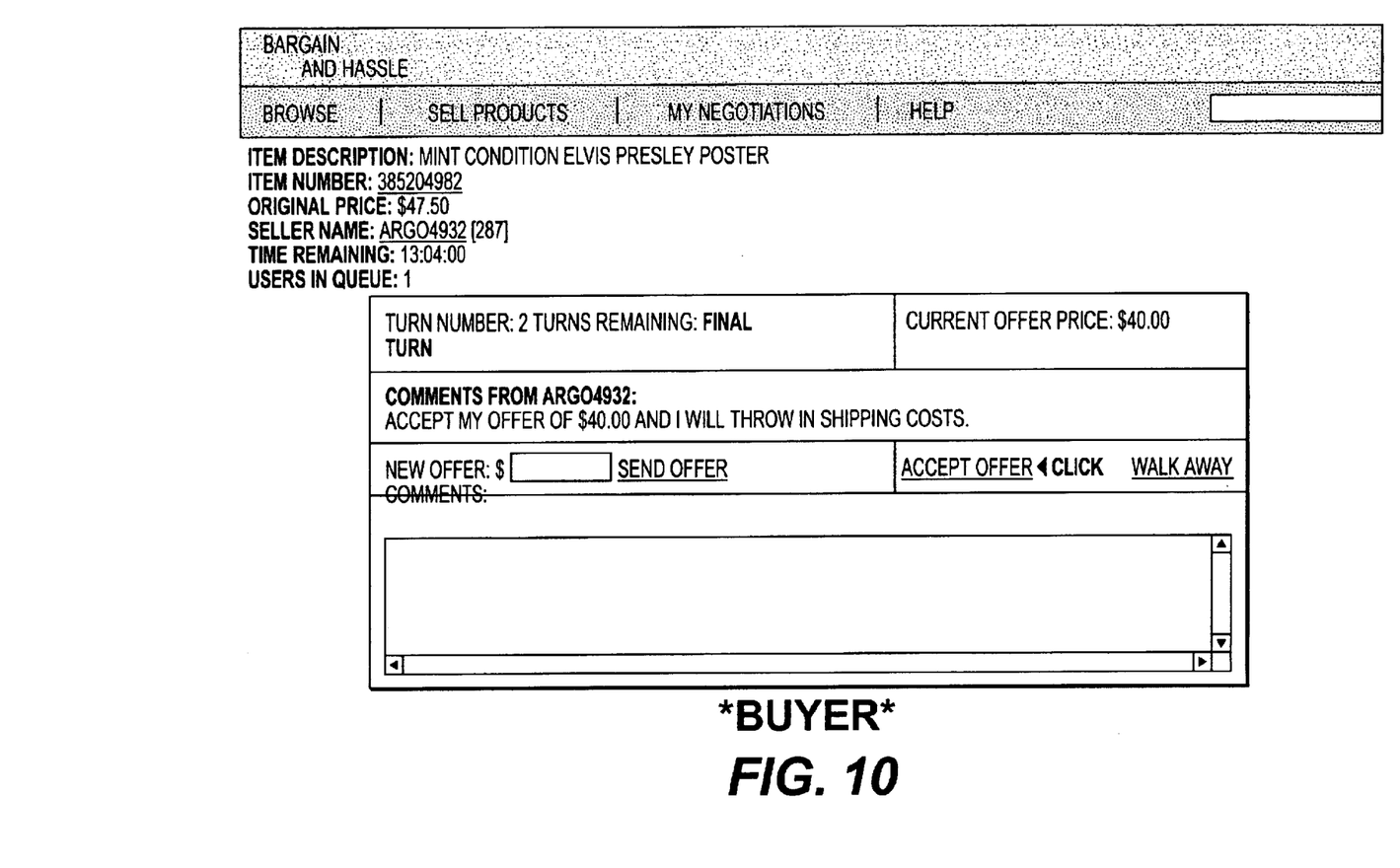
FIG. 10 shows a sample bidder's page for responding to the seller's counter-offer.

In stage three, the bidder is notified 805 of the counter-offer. A hyper-link in an e-mail directs the bidder to a bidder's second offer page 806. FIG. 10 shows an example of a bidder's second offer page displayed by the system of the present invention. Similarly to the seller's first response options, the bidder may reject the counter-offer 807, accept the offer 809, or submit a second offer 808. Rejecting 807 or accepting 809 the counter-offer ends the negotiation, while submitting a second offer 808 sends the negotiation into a fourth and final stage.

In the fourth stage, the seller is notified 810 of the bidder's second offer 808. The seller response at 811 is limited to either rejecting 812 or accepting 813 the bidder's second offer. The seller's response terminates the negotiation 305 between the parties.

It will be apparent to those skilled in the art that various modifications and variations can be made in the system of the present invention without departing from the spirit or scope of the invention. Thus, it is intended that the present invention cover the modifications and variations of this invention provided they come within the scope of the appended claims and their equivalents.

What is claimed is:

1. A method for conducting an online auction that allows a seller and a bidder to negotiate a transaction, comprising:
   displaying information about an item for auction;
   receiving multiple offers from one or more bidders;
   storing said offers;
   presenting one offer at a time to the seller;
   enabling the seller and only one bidder to negotiate by allowing the seller and the bidder each a predetermined number of responses; and
   enabling the seller and a subsequent bidder to negotiate, after the predetermined number of responses is met without a sale.

2. The method of claim 1, further comprising the step of ending the online transaction, when the seller and a bidder successfully negotiate a selling price for the item.

3. The method of claim 1, further comprising the step of ending the online transaction after a predetermined length of time.

4. The method of claim 1, wherein the item may be for sale, lease, or exchange.

5. The method of claim 1, wherein the information about the item includes at least one of a description, a picture, a video, or a sound file.

6. The method of claim 1, wherein receiving multiple offers from one or more bidders includes receiving a comment from the bidder.

7. The method of claim 1, wherein the offer from at least one bidder is confidential.

8. The method of claim 1, wherein enabling the seller and only one bidder to negotiate by allowing the seller and the bidder each a predetermined number of responses is confidential.

9. The method of claim 1, wherein enabling the seller and only one bidder to negotiate by allowing the seller and the bidder each a predetermined number of responses further comprises the step of preventing the seller from negotiating with more than one buyer at a time.

10. The method of claim 1, wherein presenting one offer at a time to the seller includes sending an e-mail to the seller.

11. The method of claim 1, wherein storing said offers includes storing one or more subsequent offers while the seller is negotiating.

12. The method of claim 1, wherein presenting one offer at a time to the seller includes presenting the offers to the seller in the order in which they were received.

13. The method of claim 1, further comprising the step of displaying information about the seller.

14. The method of claim 13, wherein the information about the seller includes at least one of the seller's geographic location, online transaction rating, or selling history.

15. The method of claim 1, wherein displaying information about an item for auction includes displaying information regarding the status of the item.

16. The method of claim 15, wherein the status of the item includes whether there is one or more pending offers.

17. The method of claim 15, wherein the status of the item includes an indication of the number of pending offers.

18. The method of claim 1, wherein the information about the item includes the terms of the transaction.

19. The method of claim 18, wherein the terms of the transaction include the seller's asking price.

20. The method of claim 18, wherein the terms of the transaction include the seller's shipping terms.

21. The method of claim 18, wherein the terms of the transaction include the seller's payment methods.

22. The method of claim 1, further comprising the step of receiving information from the seller.

23. The method of claim 22, wherein receiving information from the seller includes receiving information about the item.

24. The method of claim 23, wherein information about the item includes at least one of a description, a picture, a video, or a sound file.

25. The method of claim 22, wherein receiving information from the seller includes receiving information regarding the terms of the transaction.

26. The method of claim 25, wherein the terms of the transaction includes at least one of a seller's asking price, shipping terms, or payment methods.

27. The method of claim 1, wherein enabling the seller and only one bidder to negotiate by allowing the seller and the bidder each a predetermined number of responses further comprises:

enabling the seller to respond to the offer;

enabling the bidder to submit a second offer; and enabling the seller to respond to the second offer.

28. The method of claim 27, wherein enabling the seller to respond to the offer includes enabling the seller to reject the offer, accept the offer, or make a counter-offer.

29. The method of claim 27, wherein enabling the seller to reject the offer terminates the negotiation.

30. The method of claim 27, wherein the counter-offer includes a comment.

31. The method of claim 27, wherein the step of enabling the seller to respond to the second offer includes enabling the seller to reject or accept the offer.

32. The method of claim 31, wherein enabling the seller to reject the offer terminates the negotiation.

33. The method of claim 27, wherein the step of enabling the bidder to submit a second offer includes enabling the bidder to reject the counter-offer, accept the counter-offer, or make a second offer.

34. The method of claim 33, wherein enabling the bidder to reject the counter-offer terminates the negotiation.

35. The method of claim 33, wherein the second offer includes a comment.

36. A computer-implemented system for implementing an online auction that enables a seller and a user to negotiate the sale of an item, comprising:

a display component for displaying item information that is accessible to a plurality of users;

an input system that receives multiple confidential offers from the plurality of users; and a negotiation system which provides a one-on-one format for the seller and each user that has made an offer to negotiate, the negotiation system includes a seller's interface for informing the seller of the offer and for receiving the seller's response, and a user interface for informing the user of the seller's response to the offer, whereby the seller and each user that has made an offer negotiate the terms of the item for sale.

37. The computer-implemented system of claim 36, wherein the display component includes a Web site accessible via the Internet.

38. The computer-implemented system of claim 36, wherein the item information includes at least one of a description, a picture, a video, and a sound file.

39. The computer-implemented system of claim 36, wherein the negotiation system enables the seller to negotiate with one user at a time.

40. The computer-implemented system of claim 36, wherein the negotiation system enables the seller to concurrently negotiate with each user that has made an offer.

41. The computer-implemented system of claim 36, wherein each concurrent negotiation is confidential.

42. The computer-implemented system of claim 36, wherein the item includes one or more of a product and a service.

43. A computer-implemented system for implementing an online auction that enables a seller and a user to negotiate the sale of an item, comprising:

a server computer hosting the online auction accessible via client computers;

wherein the server computer provides a user interface for displaying item information and includes input controls for receiving offers from multiple users; and wherein the server computer provides a seller interface for displaying one offer at a time to the seller in the order in which the offers were received from the users and includes input controls for responding to the offer, whereby the user interface displays the seller's response, thereby enabling the seller and user to negotiate the sale price of the item.

44. The computer-implemented system of claim 43, wherein the online auction system is accessible via the Internet.

45. The computer-implemented system of claim 43, wherein the item includes one or more of a product and a service.

* * * * *